(12) United States Patent
Minami et al.

(10) Patent No.: US 6,338,688 B1
(45) Date of Patent: Jan. 15, 2002

(54) COVER STRUCTURE OF BELT CONVERTER

(75) Inventors: Toru Minami, Kakogawa; Itsuo Takegami, Kobe, both of (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/406,933

(22) Filed: Sep. 28, 1999

(30) Foreign Application Priority Data

Sep. 29, 1998 (JP) ............................................ 10-274961

(51) Int. Cl.⁷ .......................... B62J 13/01; F16H 57/00
(52) U.S. Cl. ........................................ 474/144; 474/146
(58) Field of Search ................................. 474/144, 146, 474/150; 74/606 R; 285/320; 24/563, 543, 545; 403/329

(56) References Cited

U.S. PATENT DOCUMENTS

| | | | | |
|---|---|---|---|---|
| 4,697,665 A | * | 10/1987 | Eastman et al. | 180/230 |
| 5,540,463 A | * | 7/1996 | Potokar | 285/319 |
| 5,725,446 A | * | 3/1998 | Kaku et al. | 474/13 |
| 5,976,044 A | * | 11/1999 | Kuyama | 474/93 |
| 6,029,542 A | * | 2/2000 | Wöntner | 74/606 R |
| 6,053,072 A | * | 4/2000 | Schleuder | 74/606 R |
| 6,105,700 A | * | 8/2000 | Williams et al. | 180/219 |

FOREIGN PATENT DOCUMENTS

| | | |
|---|---|---|
| JP | 63179296 | 11/1988 |
| JP | 6430961 | 2/1989 |
| JP | 3204436 | 9/1991 |
| JP | 3220025 | 9/1991 |

* cited by examiner

*Primary Examiner*—David A. Bucci
*Assistant Examiner*—Marcus Charles (57) ABSTRACT

A cover structure for a belt converter facilitating more easily inspecting or replacing a drive belt in a small vehicle in which an obstacle is provided in such a direction as to hinder removal of a cover configured for covering an outer periphery and an outer side face portion of a belt converter.

13 Claims, 9 Drawing Sheets

COVER STRUCTURE OF BELT CONVERTER

BACKGROUND OF THE INVENTION

1. Field of the Invention

The invention relates to a cover structure of a belt converter (a stepless belt transmission) to be mounted as a speed transmission on a vehicle (which will be hereinafter referred to as a small vehicle in this specification) such as a three-wheel or four-wheel utility vehicle, a three-wheel or four-wheel leisure vehicle, a snowmobile or the like, and more particularly to a dividing structure of the cover.

2. Description of the Related Art

A small vehicle is described in Japanese Unexamined Utility Model Publication No. Sho 63-179296. In such a small vehicle, a belt converter has conventionally been employed as a speed transmission means because its structure is simple, a speed changing or "shifting" operation is unnecessary, and a shock or jerk is not caused upon or by a speed change.

Figure 9:
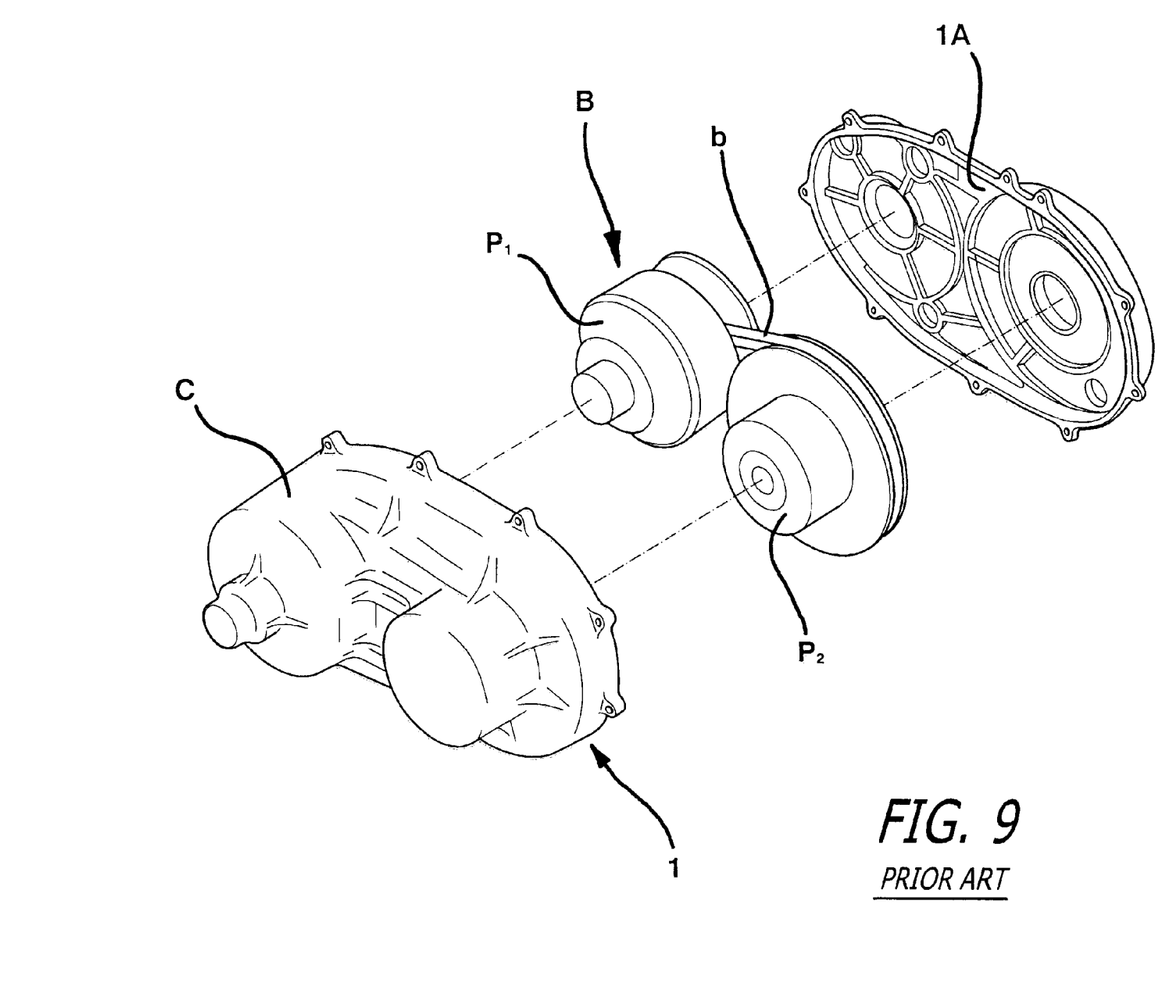
FIG. 9 is a perspective view showing a structure of a cover according to the prior art.

The belt converter is wholly covered with a housing so as to protect it from sand, dust and the like. With reference to FIG. 9, which shows a conventional configuration, a drive pulley $P_1$, a driven pulley $P_2$ and a drive belt b are provided in the housing. The drive pulley $P_1$ is formed by a variable width pulley (which will be hereinafter referred to as a variable pulley in this specification) driven by a drive shaft of an engine. The driven pulley $P_2$ is formed by a variable pulley to be driven by the drive pulley $P_1$ through the drive belt b.

The housing 1 of the belt converter B usually comprises an inner side wall 1A of the engine side which is formed of a metal, and a bowl-shaped cover C for covering the inner side wall IA as shown in FIG. 9. The cover C is formed integrally by a oval-like shaped outer peripheral portion for covering the outer peripheries of the pulleys and the drive belt, and a side portion for covering side portions of the pulleys and the drive belt on the side opposite the engine.

In a small utility vehicle, the belt converter is often provided below a luggage deck(tray) positioned slightly behind a driver's seat. In such case, when the cover C of the belt converter B is to be removed, the following work steps are required because there are obstacles, such as a shock absorber and the like, in the direction of the removal of the cover C. First of all, the vehicle is jacked up, and then a tire and the shock absorber are removed from the vehicle. Furthermore, wires(cables) are removed if necessary. Thereafter, the cover C is removed. In a case where the cover C is to be reassembled, the work should be performed in reverse order. In a case where the wiring was removed, attaching and adjusting of the wires should be performed, then the shock absorber and the tire should finally be re-affixed and the jack should be lowered. Accordingly, various parts other than the cover need to be removed, attached and adjusted for the removal and attachment of the cover. Therefore, it takes considerable time, and a complicated task is to be performed each time the cover is removed and-re-attached.

However, the above-mentioned removal and attachment of the cover is required when routine periodic inspection of the drive belt, ad replacement based thereon, are to be performed. Accordingly, a very troublesome working procedure should be performed regularly, which is problematic.

SUMMARY OF THE INVENTION

In order to solve the above-mentioned problems, it is an object of the invention to provide a cover structure of a belt converter in which a drive belt can more easily be inspected or replaced.

A first aspect of the invention is directed to a cover structure of a belt converter for a small vehicle, where the vehicle has a structure in which an obstacle is provided so as to make it difficult to remove a cover for covering an outer periphery and outer side face portions of the belt converter, wherein the cover is divided into a cylindrical part for covering the outer periphery of the belt converter and a outer side face part for covering the outer side face portion of the belt converter, and the cylindrical part is fixed, by fixing means, to an inner side wall provided on inner side of the belt converter, forming an inner part of a housing of the belt converter, and the outer side face part is fixed to the cylindrical part by the fixing means, and an internal pulley forming a part of the belt converter is visible and detachable from an outer side of the vehicle by removing the side face part from the cylindrical part.

According to the cover structure of the belt converter, the cover is divided into the cylindrical part and the outer side face part as described above. Therefore, access to the belt converter can be had if there is a space for moving only the outer side face part of the cover in the direction of the removal. With the outer side face part removed, the belt can be inspected and replaced. Even if the outer side face part is removed, the cylindrical part can be kept attached, as it is, in a predetermined state. Consequently, the cover can be attached easily in a short time.

A second aspect of the invention is directed to a cover structure of a belt converter for a small vehicle having a structure in which an obstacle is provided so as to make it difficult to remove a cover for covering an outer periphery and outer side face portions of the belt converter, wherein the cover is horizontally divided to an upper cover and a lower cover along a line connecting centers of rotation of the drive pulley and the driven pulley of the belt converter and, a space for a belt of the belt converter to pass through is formed between the cover and the belt converter including the pulleys for taking out the belt from the belt converter, when one of the upper cover and the lower cover is removed.

According to the cover structure of the belt converter, the cover is divided into upper and lower covers. Therefore, access to the belt converter can be had if there is a space for removing only the one of the upper and lower covers of the cover upwardly or downwardly. With the one of the upper and lower covers removed, the belt can be inspected and replaced.

A third aspect of the invention is directed to a cover structure of a belt converter for a small vehicle having a structure in which an obstacle exists making it difficult to remove a cover for covering an outer periphery and outer side face portions of the belt converter, wherein the cover is divided to have an inspection window cover configured to make it possible to take out a pulley of the belt converter as a separate member on an outside of at least one of the pulleys disposed in the cover.

According to the cover structure of the belt converter, the inspection window cover is provided in the cover as described above. Therefore, if there is a space for moving the inspection window cover vertically or horizontally on the side of the inspection window cover, the inspection window cover can be removed. With the inspection window cover removed, the belt and the pulley can be inspected. Accordingly, even if there is a very small space outside of the cover, the inspection can be carried out.

According to the cover structure of the belt converter in accordance with the first, second and third aspects of the invention, in a case where the obstacle is disposed in the direction of the removal of the cover for covering from the outer periphery and outer side of the belt converter, the belt can simply be inspected or be inspected and replaced, without removing and attaching various parts other than the cover. This is a difference from a conventional manner of inspection and replacement.

In the cover structure of a belt converter according to one embodiment of the invention, at least one of the fixing means for fixing the outer side face part to the cylindrical part can comprise a bolt. The outer side face part can be removed and attached easily.

In the cover structure of a belt converter according to another embodiment of the invention, at least one of means for attaching the outer side face part to the cylindrical part can comprise a clamp-type fixture formed by curving a leaf spring. The outer side face part can be removed and attached more easily in this embodiment also.

In the cover structure of a belt converter according to one embodiment of the invention, faces for attaching the outer side face part to the cylindrical part can have a concave-convex fitting structure. A structure in which a seal member is provided between fitting faces of the two members is advantageous in that dust can be prevented from getting in, and rigidity of the whole cover can be enhanced.

In the cover structure of a belt converter according to one embodiment of the invention, the cover can be made of plastics.

These objects as well as other objects, features and advantages of the present invention will become more apparent to those skilled in the art from the following description, with reference to the accompanying drawings.

DETAILED DESCRIPTION OF THE PREFERRED EMBODIMENT(S)

Figure 1:
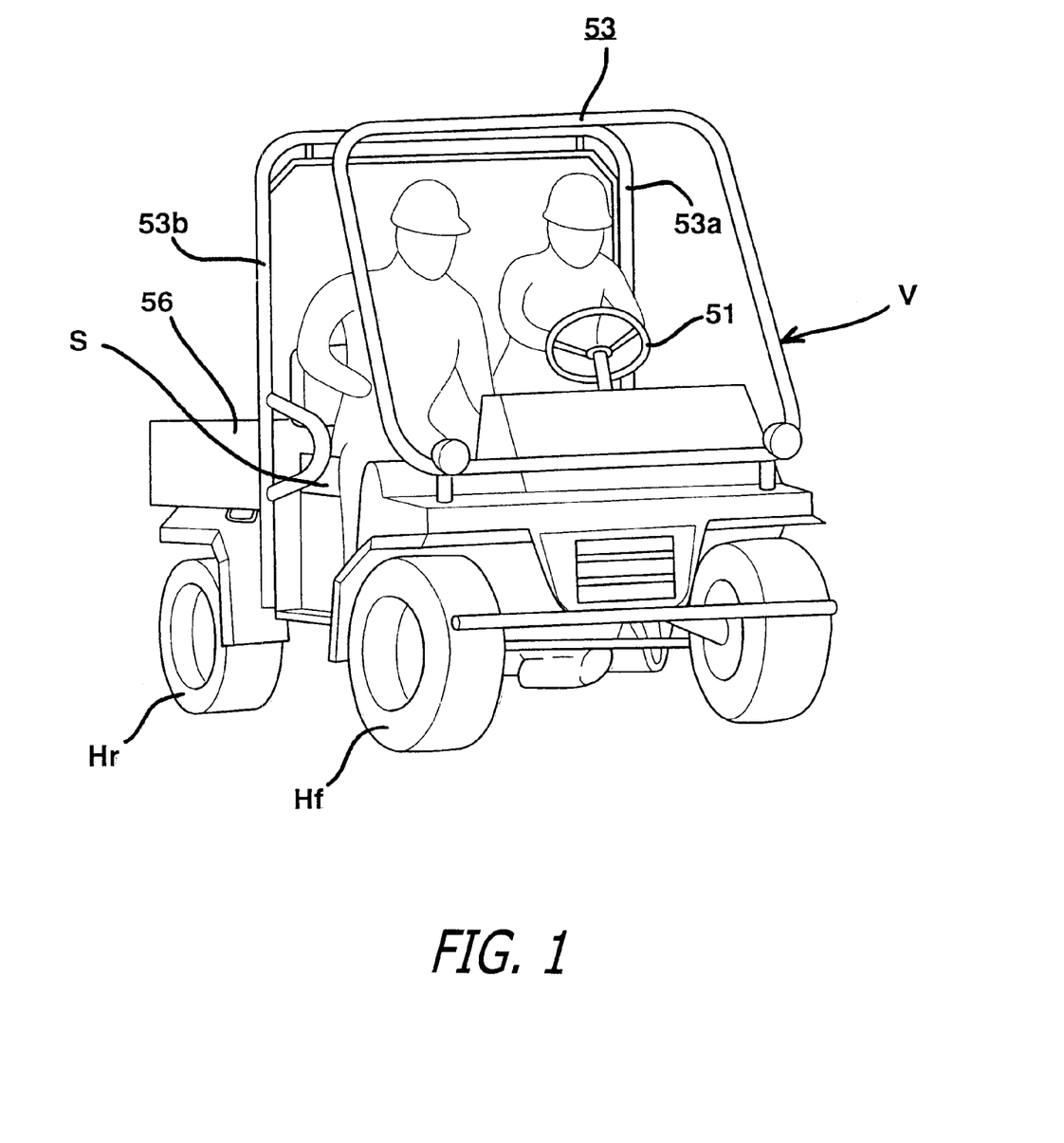
FIG. 1 is a perspective view showing the appearance of a small four-wheel utility vehicle according to an embodiment of the invention.
Figure 2:
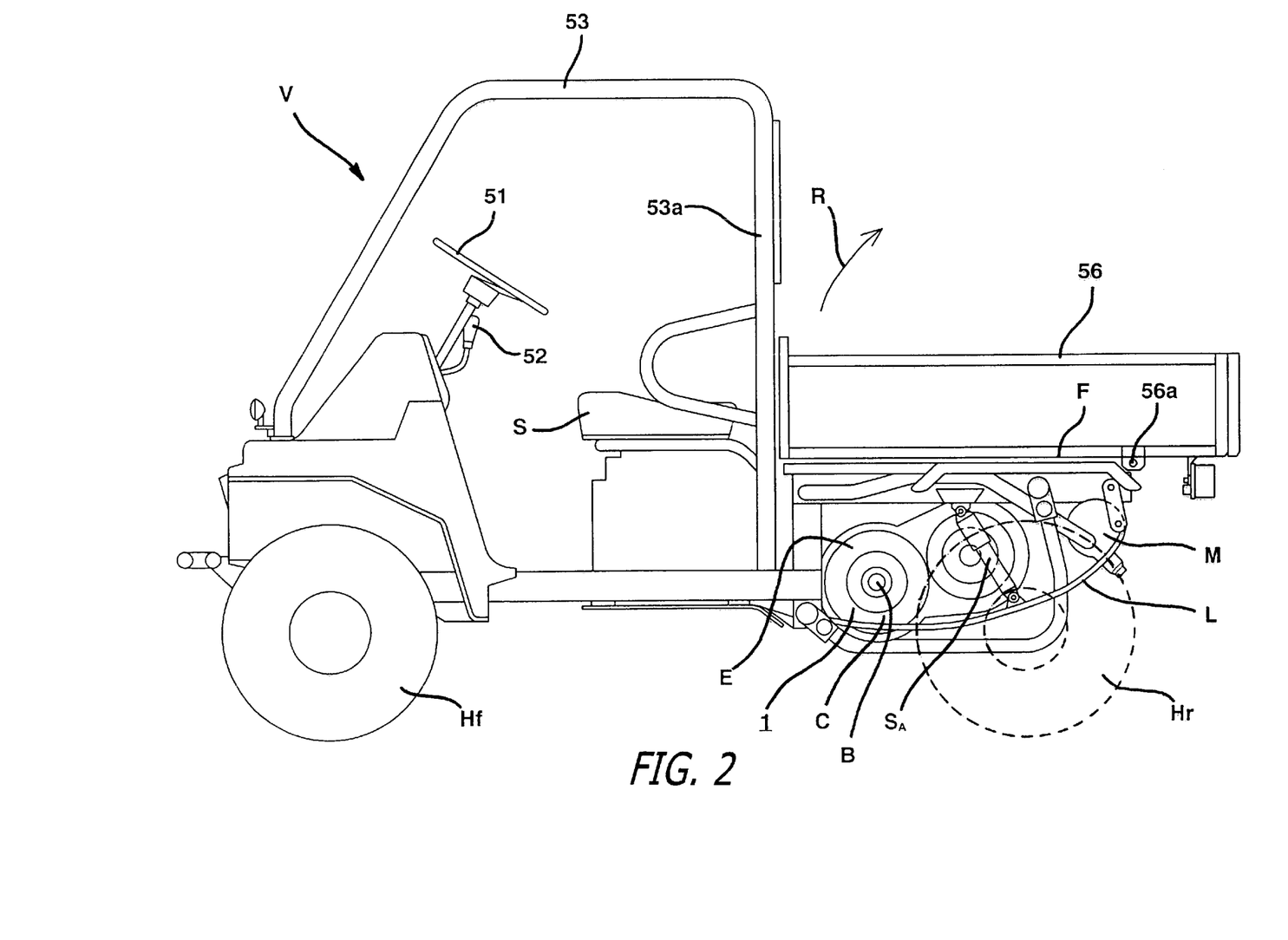
FIG. 2 is a side view of the small four-wheel utility vehicle shown in FIG. 1, illustrating a rear wheel by dashed lines.
Figure 3:
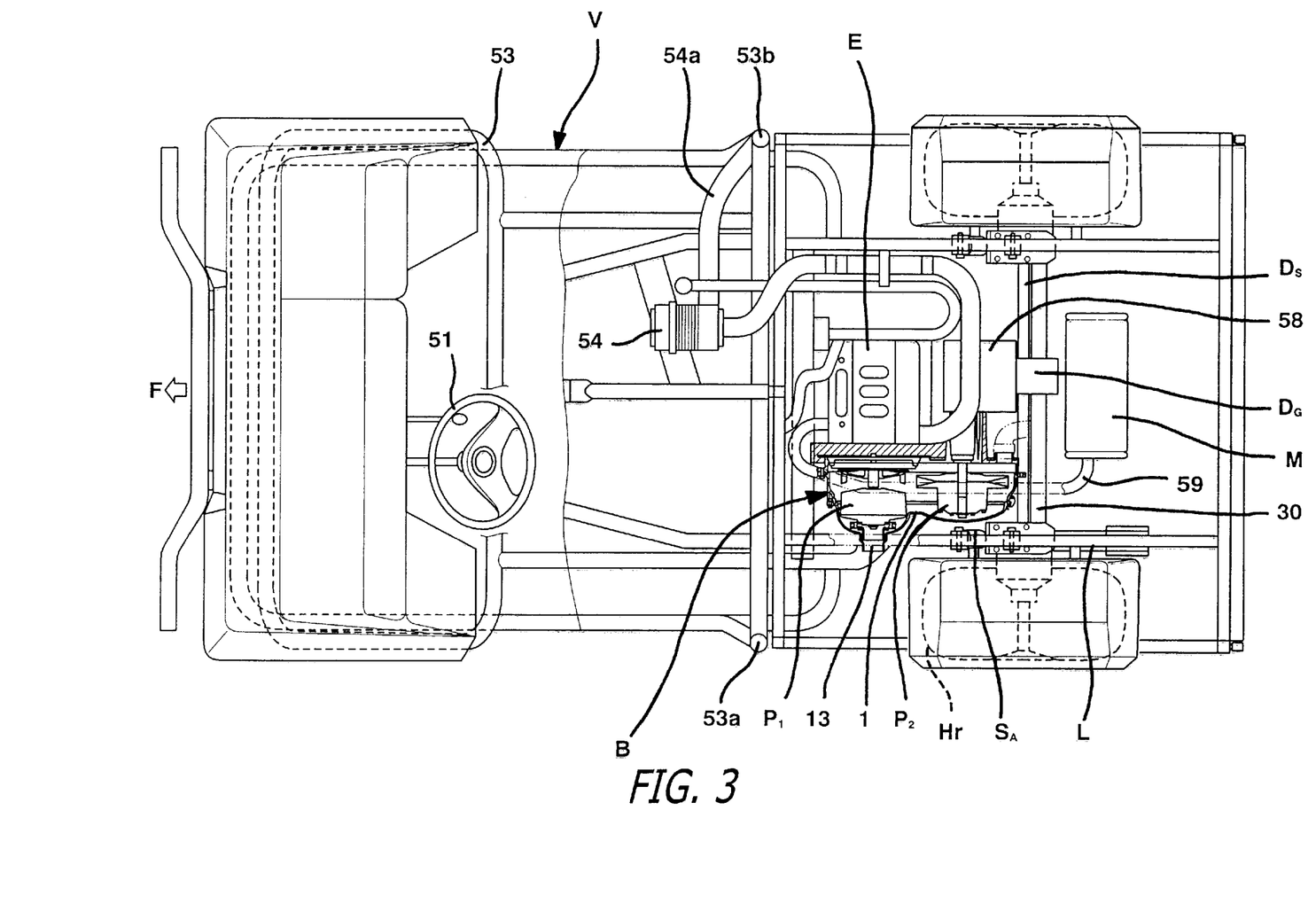
FIG. 3 is a plan view partially in section, illustrating the small four-wheel utility vehicle shown in FIG. 1, with a floor portion of a luggage deck removed and a belt converter shown in section at a horizontal center line thereof.

With reference to FIGS. 1–3, a cover structure of a belt converter according to an embodiment of the invention will be described below with reference to the drawings by taking, as an example, a belt converter B mounted on a small four-wheel utility vehicle V which is a kind of a small vehicle.

In FIGS. 1 to 3, the small four-wheel utility vehicle V has a structure in which power, transmitted from an engine E provided below a luggage deck(tray) behind a seat S, is changed into a desired speed by a belt converter B, provided on the left side of the engine E, thereby driving rear wheels Hr through a differential gear $D_G$ and right and left drive shafts $D_S$. The small four-wheel utility vehicle V is of a four-wheel drive type. Therefore, front wheels Hf can also be driven through a drive shaft (not shown) which is extended forward from a gear box 58 in which the differential gear $D_G$ is housed.

Figure 4:
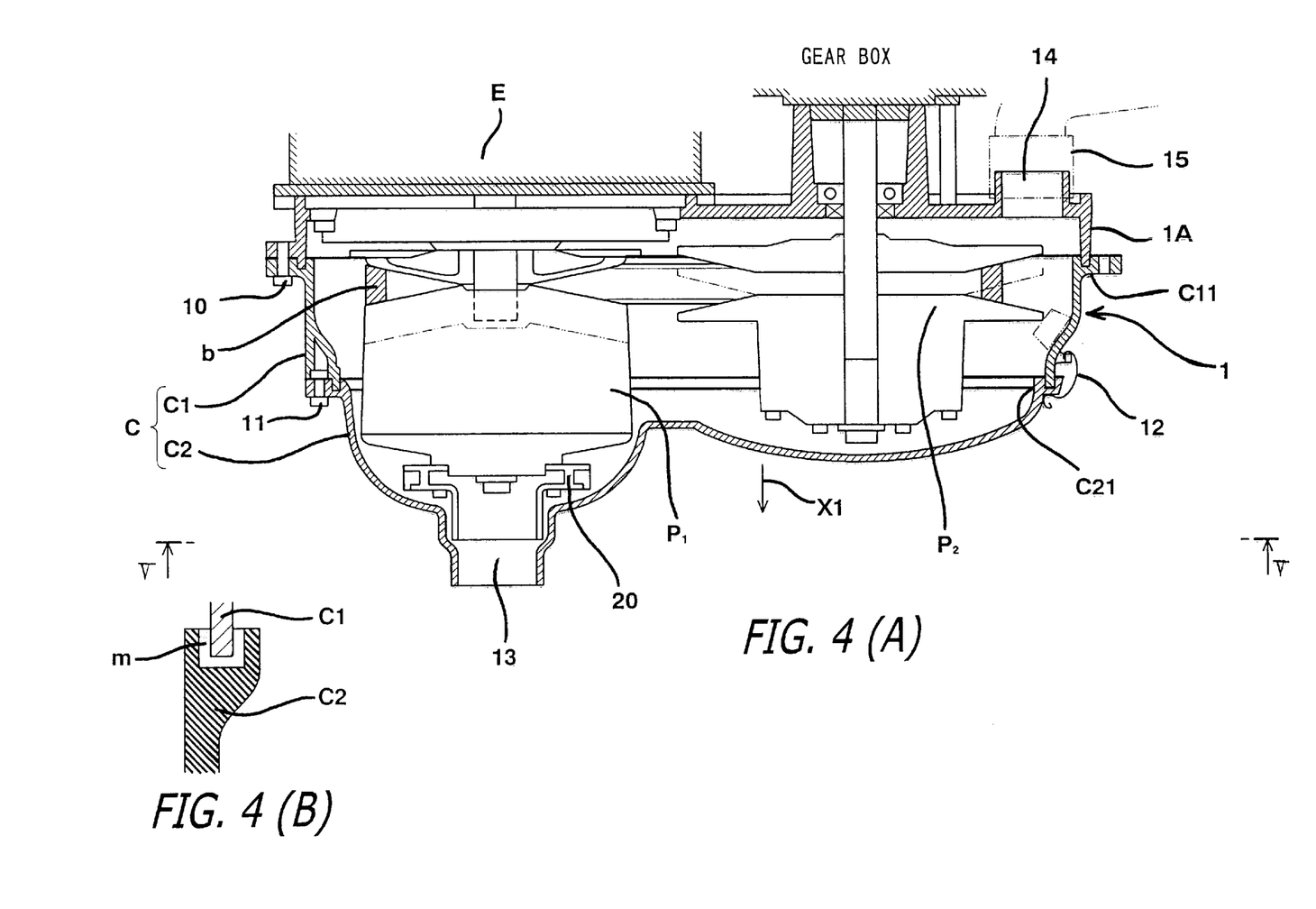
FIG. 4A is an enlarged plan view partially in section, showing a main part of the belt converter and cover in one embodiment in accordance with principles of the invention, seen from above, which is taken along a line connecting shafts of variable pulleys of the belt converter.
FIG. 4B is an enlarged view illustrating a structure of a fitting portion of the cover shown in FIG. 4A taken at circular line 4B.

With reference also to FIG. 4A, in the small four-wheel utility vehicle V, a housing 1 of the belt converter B includes an inner side wall 1A provided on the engine E side, and a cover C which can be attached thereto, as shown in FIG. 4A. The inner side wall 1A is a part of and functions as an outer-wall of the engine E, and has a protruded lip provided on the periphery. The inner side wall has an almost flat face surrounded by the protruded lip. The cover C is provided on the opposite side from the engine E side of the inner side wall 1A, and has such a shape as to protrude to the left (out side of the vehicle) from inner side wall 1A in the form of a bowl, containing variable pulleys (a drive pulley and a driven pulley) $P_1$ and $P_2$ therein. The cover C is removably attached to the inner side wall 1A through a seal member which is not shown.

As shown in FIGS. 2 and 3 (an arrow F represents a forward direction of the vehicle in FIG. 3), a leaf spring L is provided in a longitudinal direction of the vehicle and a shock absorber $S_A$ is vertically provided on the outside of the cover C (below the cover C in FIG. 3), and a left rear wheel Hr is provided on the outside of the shock absorber $S_A$ (below the shock absorber $S_A$ in FIG. 3) in such a position that the leaf spring L, the shock absorber $S_A$ and the left rear wheel Hr become obstacles respectively when the cover C is to be removed toward the left side (downward in FIG. 3) of the vehicle. Furthermore, a metal plate forming a floor face F of the luggage deck 56 is provided above the cover C as shown in FIG. 2, and becomes an obstacle when the cover C is to be removed upward. As also shown in FIGS. 2 and 3, a muffler M is provided slightly apart from the cover C rearward, and a pipe 30 having a large diameter which acts as a main cross member of the vehicle is provided slightly above the cover C rearward. The muffler M and the pipe 30 become obstacles respectively when the cover C is to be removed.

Figure 5:
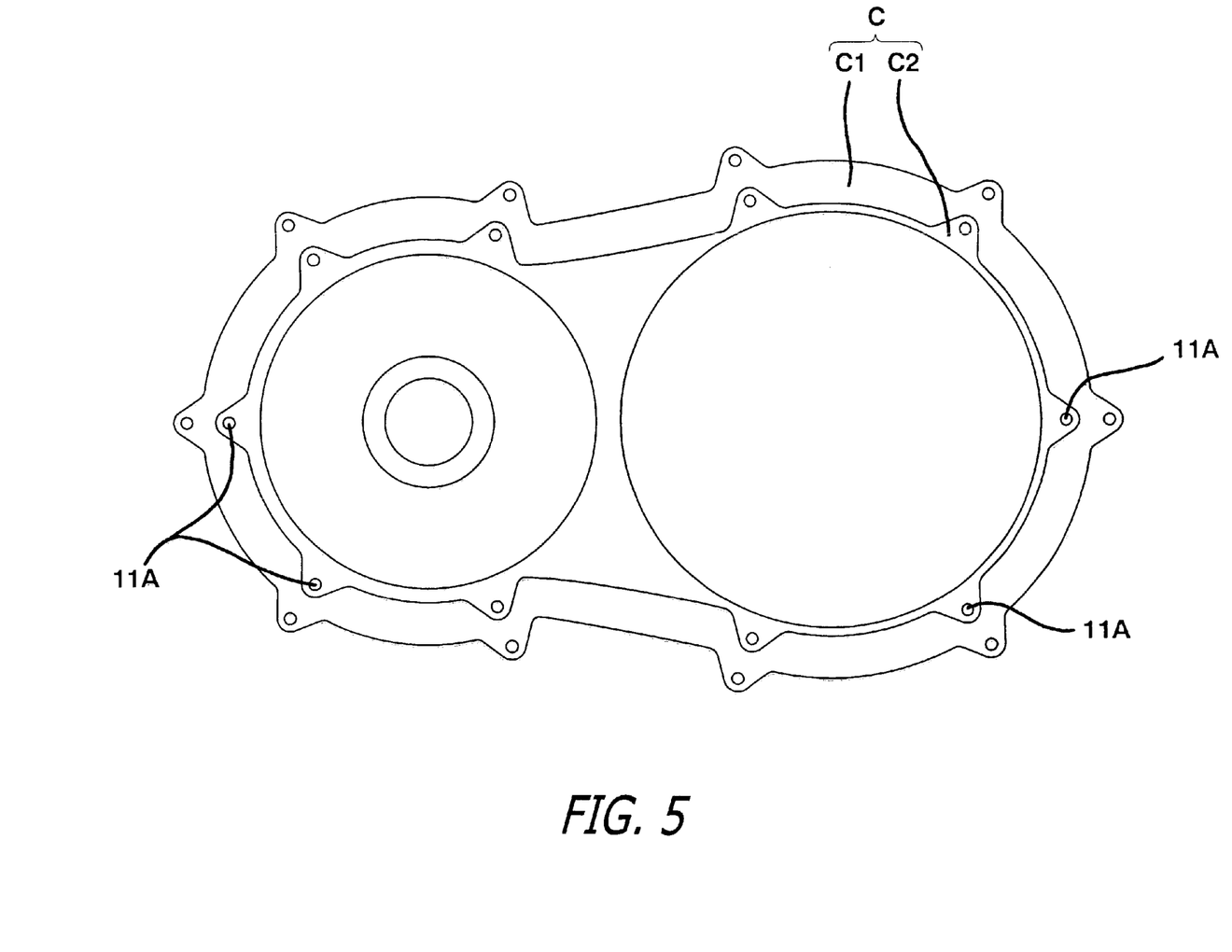
FIG. 5 is a side view illustrating the cover of the belt converter shown in FIG. 4A, which is seen in a direction of V—V in FIG. 4A.
Figure 6:
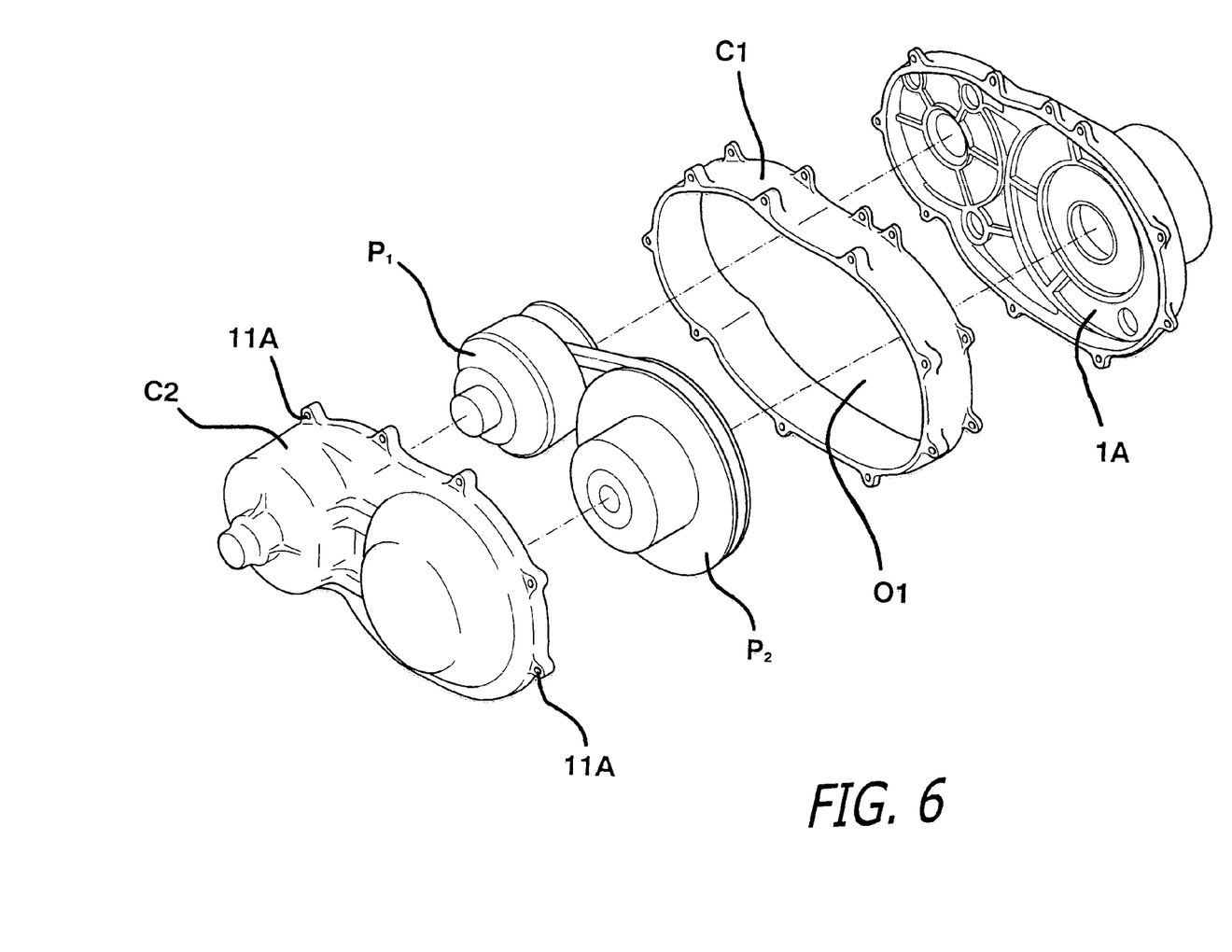
FIG. 6 is an exploded perspective view illustrating the main part of the belt converter shown in FIG. 4A.

The cover C is shown in FIG. 4A, which is a partially enlarged sectional view illustrating the belt converter portion, and is divided into a cylindrical part C1 for covering an outer peripheral portion of the belt converter and a outer side face part C2 for covering an outer side face portion of the belt converter as shown in FIG. 5, which is a front view illustrating the cover, and in FIG. 6, which is an exploded perspective view. The cylindrical part C1 and the outer side face part C2 made of plastics like a fiberglass reinforced plastic(FRP). The cylindrical part C1 has an almost elliptical shape which conforms to the outer shape of the inner side wall 1A of the engine side as shown in FIG. 6, and is fixed, with a fixing bolt 10 (see also FIG. 4A), to the inner side wall 1A which also acts as the side wall on the engine E side. The outer side face part C2 having the shape of a shallow bowl is fixed to the cylindrical potion C1 with a fixing bolt 11 (see FIG. 4A) and a clamp type fixture 12 which is formed by curving a leaf spring. Alternatively, the outer side face part C2 may be fixed with only the fixing bolts 11 through a bolt hole 11A shown in FIGS. 5 and 6 without using the clamp type fixture 12. An end of the cover side of the inner side wall 1A is joined almost airtightly with a concave-convex fitting structure into a groove C11, which is circumferentially provided on an end face of the cylindrical part C1 on the inner side wall 1A side, and has a U-shaped section as shown in FIG. 4A. An end face of the cylindrical part C1 on the outer side face part side is joined almost airtightly with a concave-convex fitting structure into a groove C21 which is circumferentially provided on an end face of the outer side face part C2, and has a U-shaped section as shown in FIG. 4B. A seal member m formed of CR sponge rubber is provided between the joined faces of the fitting structure. As shown in FIG. 4(A) a cylindrical cooling air intake 13 is opened in the drive pulley $P_1$ side portion of the outer side face part C2, and a centrifugal fan 20 for cooling air intake is formed on an end of the drive pulley $P_1$ on the intake 13 side. An exhaust port 14 for exhausting air supplied from the intake 13 to cool the inside of the cover C is formed in the inner side wall 1A. The exhaust port 14 communicates with the outside through a connecting pipe 15.

With reference to FIG. 6, an opening O1 of the cylindrical part C1, that is, the opening O1 formed on the side of the cylindrical part C1 after the outer side face part C2 is removed, has such a size as to allow axial movement of at least one of the drive pulley $P_1$ and the driven pulley $P_2$, and to remove the belt b toward the side with the cylindrical part C1 fixed to the inner side wall 1A. Furthermore, in a case where the opening O1 has such a size as to allow removal of both the drive pulley $P_1$ and the driven pulley $P_2$ toward the side, the belt b can be removed more easily and the pulleys $P_1$ and $P_2$ can also be inspected and replaced.

With reference to FIGS. 4A, 4B, 5 and 6, since the cover C is divided into two separate members in the direction of a width of the vehicle, that is, the cylindrical part C1 and the outer side face part C2, the belt b provided in the belt converter B can be inspected or replaced by removing only the outer side face part C2. More specifically, fixing bolts 11 provided around the outer side face part C2 (and the leaf spring type fixture 12 if any) is (are) removed, and only the outer side face part C2 having a smaller volume than the volume of the cover C is properly moved in a direction toward the side of the vehicle (see a direction shown by an arrow X1 in FIG. 4A) or in a composite direction such as a direction of the side and downward (or an upward ) or the like. Consequently, for example, even if the shock absorber (SA in FIG. 3) is provided in the direction of the side of the cover C, the cover can be removed while avoiding shock absorber $S_A$.

Figure 7:
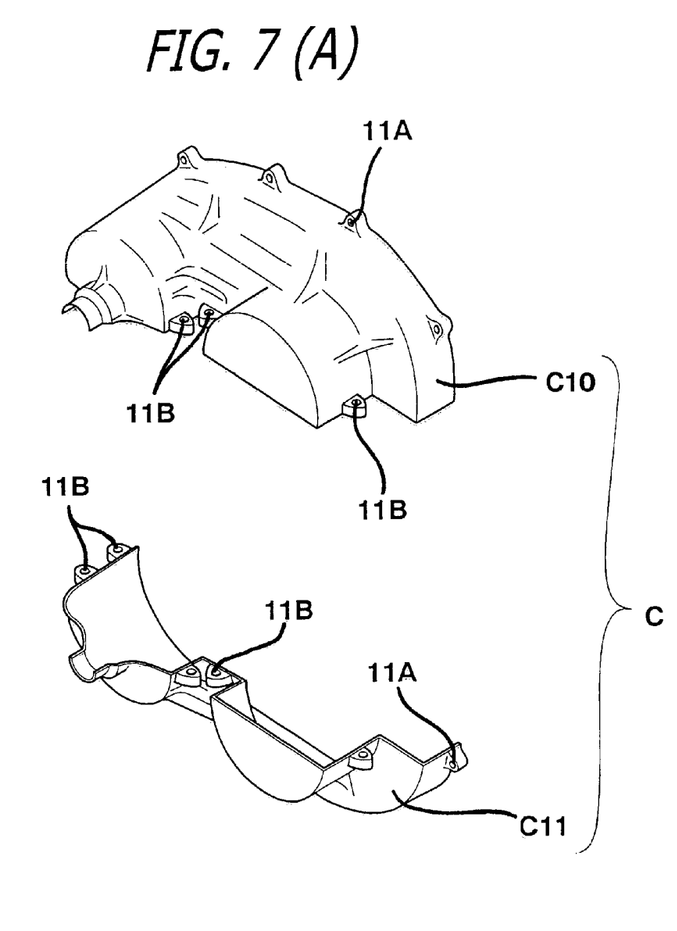
FIG. 7A is an exploded perspective view of a cover illustrating a cover structure according to another embodiment of the invention.
FIG. 7B is a perspective view illustrating the cover of FIG. 7A which has 30 not been exploded (the assembled cover)
FIG. 7C is an enlarged view illustrating a structure of a fitting portion of the cover shown in FIGS. 7A and 7B.

With reference to FIGS. 3, 4A, 7A, 7B and 7C, in another embodiment, a cover C protruding to the left(the outer side of the vehicle) from the inner side wall 1A in the form of a bowl may have the following structure. More specifically, the cover C is divided into an upper cover C10 and a lower cover C11 in such a manner that a dividing line passes through center lines of the drive pulley $P_1$ and driven pulley $P_2$ (see FIGS. 3 and 4A), as shown in FIGS. 7(A,B,C). The upper cover C10 and the lower cover C11 are fixed to the inner side wall 1A of the engine E side (see FIG. 6) with fixing bolts or the like(not shown) through fixing holes 11A. In this case, it is preferable that a fixing hole 11B for fixing the upper cover C10 to the lower cover C11 should be provided as shown in FIG. 7A to fix them with fixing bolts (not shown) in order to enhance overall rigidity. In this case, a concave-convex fitting structure is provided on joined faces of the covers in the same manner as in the above-mentioned embodiment. As shown in FIG. 7C, furthermore, a seal member m is provided between the upper and lower covers C10,C11 and the inner side wall 1A and between joined faces of the upper cover C10 and the lower cover C11 in the fitting structure, thereby enhancing airtightness.

With the above-mentioned structure, if there is a space for the belt b to pass through between residual cover of upper and lower covers C10,C11 after the removal of one of them and the pulleys $P_1$, $P_2$, and the fan 20 housed in the residual cover, the belt can easily be inspected, and replaced if necessary, by removing only one of the upper cover C10 and the lower cover C11. As a matter of course, the belt b may be removed by taking off the fan 20 in a structure in which the fan 20 is removable.

Figure 8:
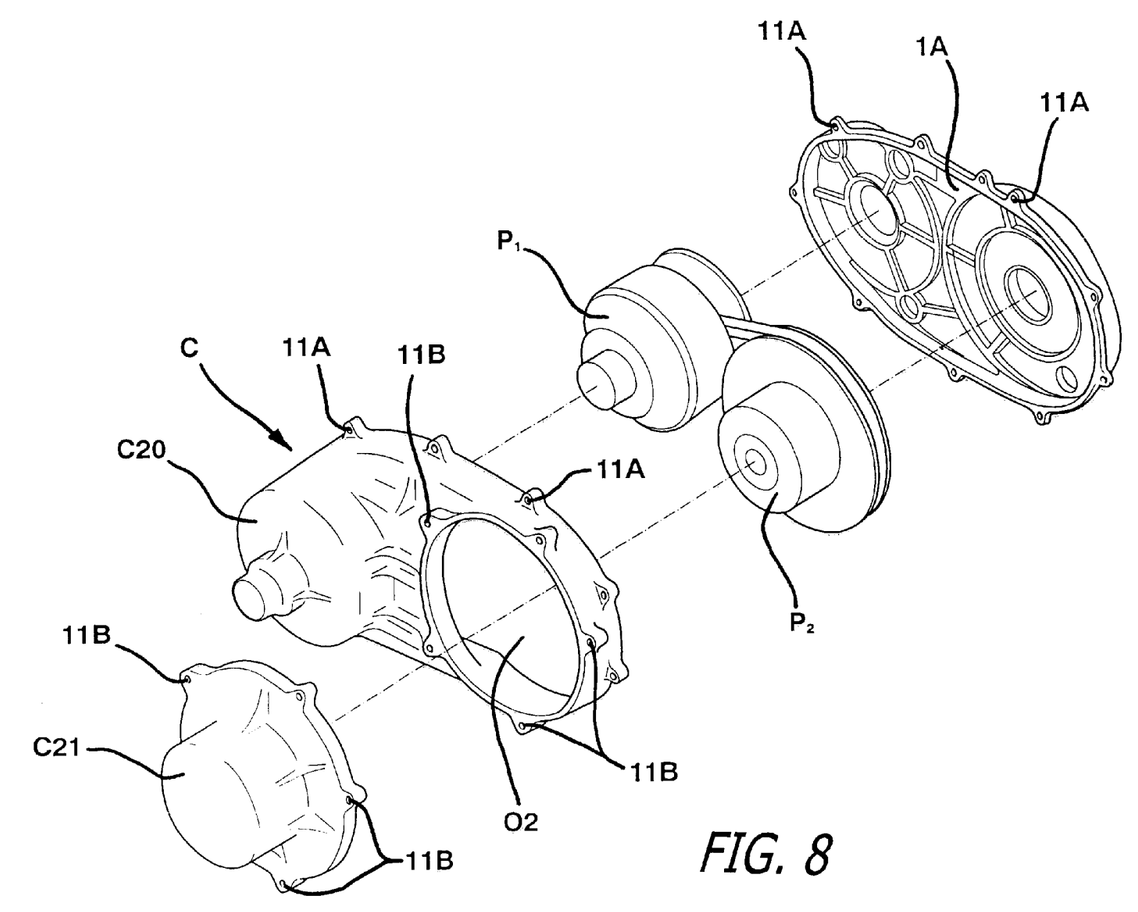
FIG. 8 is an exploded perspective view of a cover, illustrating a cover structure according to another embodiment of the invention.

In another embodiment shown in FIG. 8, alternatively, the cover C may be provided with an inspection window cover C21 detachable from main part C20 of the cover C on the corresponding side portion of one of the pulleys (the pulley $P_2$ acting as a driven pulley in an embodiment shown in FIG. 8). The inspection window cover C21 has a size for passing the pulley through toward an outside direction (such a size as to allow removal of the pulley to the outside of the vehicle). In the illustrated embodiment, the main part C20 is first fixed to the inner side wall 1A with fixing bolts or the like (not shown) through a bolt hole 11A. Then, the inspection window cover part C21 is fixed to the main part C20 with fixing bolts or the like by using bolt holes 11B. Also in this case, airtightness can easily be enhanced if joined faces have a concave-convex fitting structure in the same manner as in the above-mentioned embodiment. With such a structure, by removing only the inspection window cover C21, the belt can easily be inspected at an interval of one or two months. Alternatively, openings O2 for the drive pulley $P_1$ and the driven pulley $P_2$ to pass through may be provided on the sides thereof respectively, and the inspection window cover C21 for covering the opening O2 separated from the main part C20 are provided respectively. By such a structure, the belt can be inspected and replaced more easily. In addition, the pulley can also be replaced.

Furthermore, the cover may be divided into front and rear parts in the longitudinal direction of the vehicle, which is not shown. Also in this case, it is preferable that a concave-convex fitting structure should be provided and a seal member should be provided between the cover and the inner side wall.

A schematic structure of the small four-wheel utility vehicle V shown in FIG. 1 which employs the cover structure of the belt converter will be described below with reference to FIGS. 2 and 3. A seat S is provided in a front portion of the vehicle. A steering wheel 51 is provided in a slightly upper position ahead of the seat S, and a speed change lever 52 for remotely operating the belt converter B is provided in the vicinity of the steering wheel 51 as shown in FIG. 2. The periphery of the seat S excluding a bottom portion thereof is enclosed by a pipe frame 53. A pipe 53a of the pipe frame 53 erected on the left portion of the vehicle at the back of the seat S is connected to an intake 13 formed on the cover C of the belt converter B through a connecting tube or the like, which is not shown, so that air having less dust can be supplied. A pipe 53b of the pipe frame 53 erected on the right portion of the vehicle and at the back of the seat S is connected to an air intake of a carburetor (not shown) attaching the engine E through an air cleaner 54 and a connecting tube 54a which are provided below the seat S.

The before-mentioned luggage deck 56 for carrying a luggage and the like is provided behind the seat S. The luggage deck 56 of the vehicle according to the present embodiment can be damped in a direction shown by an arrow R through a rocking shaft 56a in FIG. 2. Accordingly, the belt converter B or the engine E can also be inspected from above with the luggage deck 56 lifted upward if luggage is not put on the luggage deck 56. In such a respect, above-mentioned structure is excellent. However, in a state in which a luggage is put on the luggage deck 56, the lifting operation cannot be performed. In this case, the inspection or the like is carried out from the bottom side of the vehicle.

The engine E having the belt converter B being assembled integrally therewith is provided below a floor F of the luggage deck 56, and a gear box 58 is provided rearward of the engine E. The differential gear $D_G$ is built in the gear box 58 to transmit power from the belt converter B to a drive shaft $D_S$. The muffler M is provided further rearward of the gear box 58. The muffler M is connected with an exhaust port of the engine E via an exhaust pipe 59. An exhaust gas from the engine E is discharged outside and gas noises are reduced by the muffler M.

The drive shaft Ds is suspended on the body by means of a leaf spring L through a bearing (not shown) rotatably, and has a tip to which the rear wheel Hr is integrally fixed.

While the embodiment of the present invention is applied for the small four-wheel utility vehicle shown in FIG. 1 has been described, it is apparent that the present invention can also be applied to various vehicles using a belt converter of this kind, for example, an all-terrain vehicle, a snowmobile, or the like, and the same functions and effects can be obtained. The structures of the cover of the belt converter shown in FIGS. 6 to 8 may properly be selected depending on a structure of a vehicle, or on a portion where the belt converter is to be provided.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A cover structure of a belt converter for a small vehicle comprising:
    a bowl-shaped cover for covering an outer portion of a converting mechanism; and
    an inner side wall defining an inner side portion of the converting mechanism, the cover being attached to the inner side wall; wherein
    the cover is divided into a cylindrical part covering an outer periphery of the converting mechanism and an outer side part covering an outer side portion of the converting mechanism,
    the cylindrical part is extended along rotational shafts of a drive pulley and a driven pulley constituting the converting mechanism from the inner side wall,
    the cylindrical part has an opening through which at least one of the drive pulley and the driven pulley is detachable toward an outward direction of the rotational shafts,
    the cylindrical part is fixed to the inner side wall by first fixing means; and
    the outer side part is fixed to the cylindrical part by second fixing means.

2. The cover structure according to claim 1, wherein there is a space between an inner face of the cylindrical part and an outer periphery of the drive pulley and there is a space between the inner face of the cylindrical part and an outer periphery of the driven pulley, to allow a belt to pass therethrough.

3. The cover structure according to claim 1, wherein at least one of the second fixing means for fixing the outer side part to the cylindrical part comprises a clamp type fixture comprising a curving leaf spring.

4. The cover structure according to claim 1, wherein the outer side part and the cylindrical part are joined with a concave-convex fitting structure and a seal member is provided there between.

5. The cover structure according to claim 1, wherein the cover is made of plastic.

6. A small four-wheel utility vehicle having an engine for driving the vehicle, a belt converter for converting the number of revolutions transmitted from the engine, and wheels driven by the engine via the belt converter, comprising:
    a cover for the belt converter that is divided into a cylindrical part covering an outer periphery of a converting mechanism of the belt converter, and an outer side part removable toward a lateral direction of the vehicle from the cylindrical part to allow at least one of a drive pulley and a driven pulley constituting the converting mechanism to be detached toward an outward direction of rotational shafts of the pulleys when the outer side part is removed, the drive pulley and the driven pulley being provided in the cover;
    a shock absorber of the vehicle provided such that it is placed laterally of the belt converter and spaced a distance apart from the belt converter;
    a luggage deck provided above the cover such that the luggage deck covers the belt converter; and
    fixing means for fixing the outer side part to the cylindrical part of the cover.

7. The small four-wheel utility vehicle according to claim 6, wherein the distance apart from the belt converter is smaller than a depth of the deepest portion of the cover.

8. The small four-wheel utility vehicle according to claim 6, wherein there is a space between an inner face of the cylindrical part and an outer periphery of the drive pulley and there is a space between the inner face of the cylindrical part and an outer periphery of the driven pulley, to allow a belt to pass there through.

9. The small four-wheel utility vehicle according to claim 6, wherein at least one of the fixing means for fixing the outer side part to the cylindrical part comprises a clamp type fixture comprising a curving leaf spring.

10. The small four-wheel utility vehicle according to claim 7, wherein the outer side part and the cylindrical part are joined with a concave-convex fitting structure and a seal member is provided there between.

11. The small four-wheel utility vehicle according to claim 7, wherein the cover is made: of plastic.

12. The small four-wheel utility vehicle according to claim 7, further comprising: a muffler provided rearwardly of the cover to prevent the cover from being removed toward a rearward direction.

13. The small four-wheel utility vehicle according to claim 7, further comprising a leaf spring and wheels provided laterally of the cover to prevent the cover from being removed toward a lateral direction.

* * * * *